(12) United States Patent
Moon et al.

(10) Patent No.: US 6,201,217 B1
(45) Date of Patent: Mar. 13, 2001

(54) COUNTER-TOP ELECTRIC COOKER

(75) Inventors: Jung S. Moon, Buffalo Grove; Rong Liu, Wheeling; Alan R. Kelley, Barrington, all of IL (US)

(73) Assignee: Heartware Home Products, Inc., Wheeling, IL (US)

( * ) Notice: Subject to any disclaimer, the term of this patent is extended or adjusted under 35 U.S.C. 154(b) by 0 days.

(21) Appl. No.: 09/290,150

(22) Filed: Apr. 12, 1999

(51) Int. Cl.[7] .............................. A47J 37/00; A47J 36/16; A21B 1/26; A21B 1/50
(52) U.S. Cl. ........................ 219/386; 219/400; 219/392; 99/476; 126/333; 126/21 A; 220/769; 220/770
(58) Field of Search .................................. 219/400, 392, 219/552, 386; 99/359, 376, 425, 446, 474, 476; 126/21 A, 333; 220/756, 757, 769, 770, 772

(56) References Cited

U.S. PATENT DOCUMENTS

| | | | |
|---|---|---|---|
| 3,851,639 | * 12/1974 | Beddoe | 126/25 R |
| 3,882,767 | * 5/1975 | Oyler, deceased et al. | 99/446 |
| 4,817,509 | * 4/1989 | Erickson | 219/400 |
| 5,217,545 | * 6/1993 | Smith et al. | 148/327 |
| 5,338,616 | * 8/1994 | Ishii et al. | 219/552 |
| 5,404,420 | * 4/1995 | Song | 219/400 |
| 5,465,651 | * 11/1995 | Erickson et al. | 99/476 |
| 5,466,912 | * 11/1995 | Dornbush et al. | 219/400 |
| 5,513,558 | * 5/1996 | Erickson et al. | 219/400 |
| 5,699,722 | * 12/1997 | Erickson et al. | 219/400 |
| 5,845,563 | * 12/1998 | Haring et al. | 99/446 |

* cited by examiner

*Primary Examiner*—Joseph Pelham
(74) *Attorney, Agent, or Firm*—Wood, Phillips, VanSanten, Clark & Mortimer

(57) ABSTRACT

A counter-top electric oven is provided that includes a number of features that prevent overheating of the components of the oven. These features include an actively cooled fan chamber, a hot gas vent, a cooling manifold that directs cooling air to cool the cooking enclosure and hot gas vented from the hot gas vent, and a base with thermally insulated supports for a metallic oven pan of the cooking enclosure.

15 Claims, 8 Drawing Sheets

COUNTER-TOP ELECTRIC COOKER

FIELD OF THE INVENTION

This invention relates to electric ovens, and in particular to counter-top electric cook ovens.

BACKGROUND OF THE INVENTION

Counter-top electric ovens are known in the art. In comparison to conventional ovens, counter-top electric ovens typically offer the advantage of being less bulky and having quicker cooking times. It is common for counter-top ovens to include a power head having a heating unit that is used to heat the cooking enclosure. It is also common for the interior of the cooking enclosure in such ovens to be accessed by manually lifting an upper portion of the cooking enclosure from the remainder of the cooking enclosure. To reduce the weight of counter-top electric ovens for portability and to provide a cooking enclosure that allows viewing of the cooking operation, counter-top electric ovens typically utilize plastic materials for a majority of their housings, including for the cooking enclosure. To reduce the cooking time, counter-top electric ovens typically will rely on a hot air stream that is cycloned around the food by a high speed fan associated with the electric heating element, or by utilizing an infrared heating element in combination with a relatively low speed fan that generates sufficient air circulation in the oven to ensure a relatively uniform temperature distribution in the oven. One example of a counter-top electric oven that utilizes an infrared electric heating element, a relatively low speed fan, and plastic housings, is disclosed in U.S. Pat. No. 5,404,420 issued Apr. 4, 1995 to Eugene Song.

One problem associated with such ovens is the heat generated by the heating unit of the power head. This heat can potentially damage plastic components of the oven and can also potentially increase the temperature of the oven housings to a point where a user cannot comfortably access the cooking enclosure. This problem is especially of concern for the components and housing near the heating unit.

As seen in the Song patent, it is also known for the lower portion of the cooking enclosure of such ovens to be defined by a metallic pan having an interior surface at which the heat generated by the heating unit is directed. The metallic pan is supported and surrounded by a plastic base which prevents the heat transmitted from the metallic pan from damaging the counter-top on which the oven is resting. One problem associated with this construction is that the metallic plate can transfer sufficient heat from the heating unit to damage housing components contacting the pan, or can transfer sufficient heat surrounding the housing to a point where a user cannot comfortably touch the surrounding housing. Another problem associated with this construction is that it can be very difficult to remove the metallic pan from the base, especially when the metallic pan is hot.

Other concerns common to counter-top ovens are the assembly and disassembly of the housings to allow the insertion and removal of food for cooking, and the cleaning of the interior of the cooking enclosure and the heating components therein.

SUMMARY OF THE INVENTION

It is the principal object of the invention to provide a new and improved counter-top electric oven.

It is another object of the invention to provide a new and improved counter-top infrared electric oven.

It is another object of the invention to provide a counter-top electric oven that minimizes the risk of heating housing components to a point where the components can be damaged or where a user cannot comfortably handle the housings during operation or soon after operation has been terminated.

An exemplary embodiment of the invention achieves at least some of the foregoing objects in a counter-top electric oven for cooking food that includes a cooking enclosure and a power head detachably connected to the cooking enclosure. The cooking enclosure includes an upper surface with an opening therein. The power head includes a heating unit extending into the cooking enclosure through said opening, a fan chamber positioned above the cooking enclosure and the heating unit, a fan mounted in the fan chamber to create a cooling air flow through the fan chamber, a plurality of air inlets to the fan chamber to allow the cooling air flow into the fan chamber, and a cooling manifold surrounding the opening in the upper surface and facing the upper surface outside of the cooking enclosure. The cooling manifold is in fluid communication with the fan chamber and includes a plurality of air outlets arranged to direct the cooling air flow from the fan chamber toward the upper surface of the cooking enclosure to cool the upper surface.

In accordance with another aspect of the invention, a counter-top electric oven for cooking food includes a cooking enclosure, a power head detachably connected to the cooking enclosure, and a plastic base that supports the cooking enclosure. The cooking enclosure includes an oven housing and a metallic oven pan having interior and exterior surfaces and located beneath the oven housing. The power head includes a heating unit extending into the cooking enclosure. The heating unit includes an electric heating element arranged to direct heat toward the interior surface of the oven pan. The plastic base has an interior that surrounds the oven pan with an air gap and includes one or more supports for the oven pan and one or more thermal insulators between the posts and the exterior surface of the oven pan to prevent overheating of the base by the heat directed at the interior surface of the oven pan.

According to one aspect of the invention, an electric oven for cooking food includes a base, a cooking enclosure supported by the base, and a power head detachably connected to the cooking enclosure. The cooking enclosure is defined by an oven housing and an oven pan located beneath the oven housing. The oven pan is surrounded by an interior of the base and includes a lip defining an outer periphery of the oven pan. A pair of retractable handles are mounted to the lip for movement between a first position where the handles are extended from the lip so that a user may grasp the handles to remove the pan from the base and a second position where the handles are retracted toward the lip to allow the oven housing to be positioned above the oven pan without interfering with the handles. The power head includes a heating unit extending into the cooking enclosure.

In accordance with one aspect of the invention, a counter-top electric oven includes a cooking enclosure and a power head detachably connected to the cooking enclosure. The power head includes a heating unit extending into the cooking enclosure. The heating unit includes a heating element for heating the cooking enclosure. The power head further includes a controller configured to selectively power the heating element between a minimum power and a maximum power and to limit the cooking time at maximum power to a predetermined period to prevent overheating of the cooking enclosure.

According to one aspect of the invention, an electric oven includes a cooking enclosure, and a power head connected to the cooking enclosure and including a heating unit extending into the cooking enclosure. The heating unit includes a heater housing defining a cavity, a heating element mounted in the cavity for heating the cooking enclosure, and a protective grid mounted to the heater housing between the heating element and the cooking enclosure. The protective grid includes oppositely directed legs, with each leg slidably received in a mating aperture in the heater housing to detachably mount the protective grid to the heater housing. The heating unit further includes a fastener engaged with the heater housing for movement between a first position where the fastener engages one of the legs to restrict movement of the grid relative to the heater housing, and a second position where the fastener is disengaged from one of the legs to allow removal of the grid from the heater housing.

According to one aspect of the invention, an electric oven includes a base having an upwardly extending wall surrounding an interior of the base, and an oven housing having a downwardly extending wall surrounding an interior of the oven housing, and an annular lip formed on the outer surface of the downwardly extending wall of the oven housing. The annular lip is engageable with the upwardly extending wall of the base to support the oven housing on the upwardly extending wall of the base with a portion of the downwardly extending wall extending below the lip and cooperating with the upwardly extending wall of the base to restrict the leakage of hot gases from the interiors of the base and the cooking enclosure. A relief is provided on the portion of the downwardly extending wall to ease engagement of the oven housing with the base.

Other objects and advantages will become apparent from the following specification taken in connection with the accompanying drawings.

DETAILED DESCRIPTION OF THE PREFERRED EMBODIMENT

Figure 1:
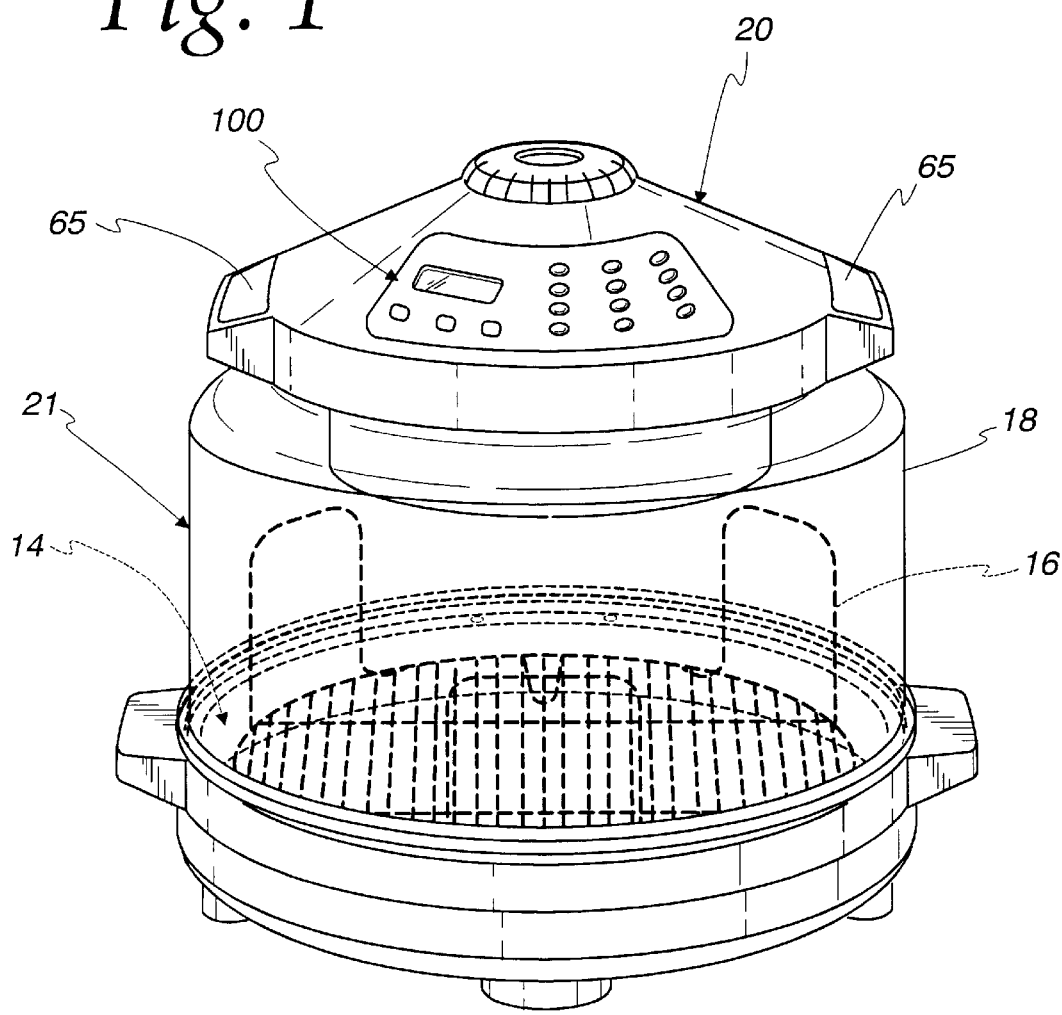
FIG. 1 is a perspective view of a counter-top infrared electric oven embodying the features of the invention.

An exemplary embodiment of a counter-top electric oven made according to the invention is described herein and is illustrated in the drawings in connection with an infrared counter-top oven. However, it should be understood that many features of the invention may find utility in other types of counter-top electric cooking ovens, including those using cyclonic air flow in combination with simple resistance electric heating elements. Accordingly, no limitation is intended to use in connection with an infrared heating element except insofar as expressly stated in the appended claims.

Figure 2:
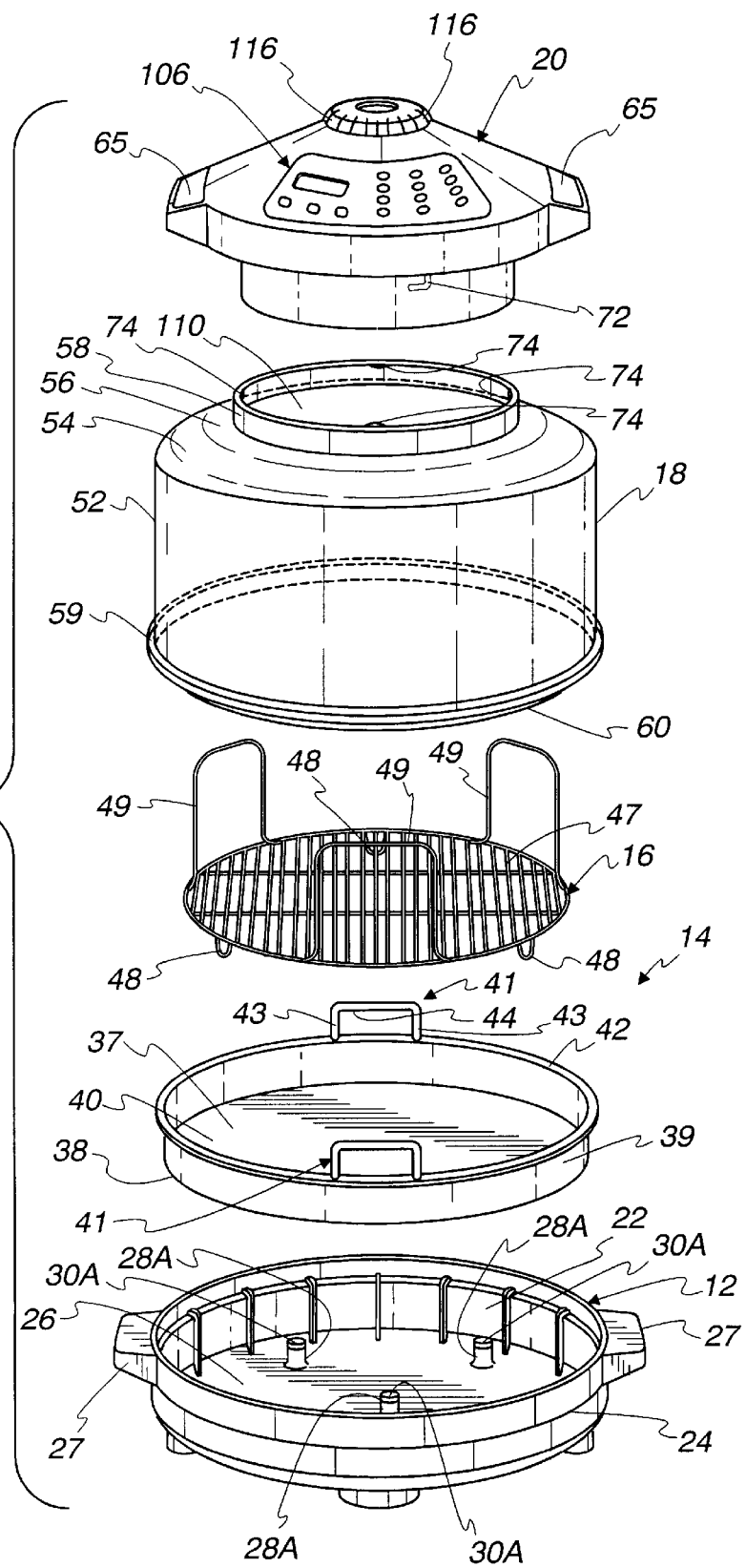
FIG. 2 is an exploded view of the oven shown in FIG. 1.

With reference to FIGS. 1 and 2, a counter-top electric oven 10 includes a base 12, an oven pan 14 supported by the base 12, a cooking rack 16 supported by the oven pan 14, a generally cylindrical, transparent oven housing 18 supported by the base 12, and a power head 20 supported on the oven housing 18 and detachably connected to the oven housing 10. Together, the oven pan and the oven housing 18 define a cooking enclosure 21 with the oven 10 is in the assembled state shown in FIG. 1.

Figure 3:
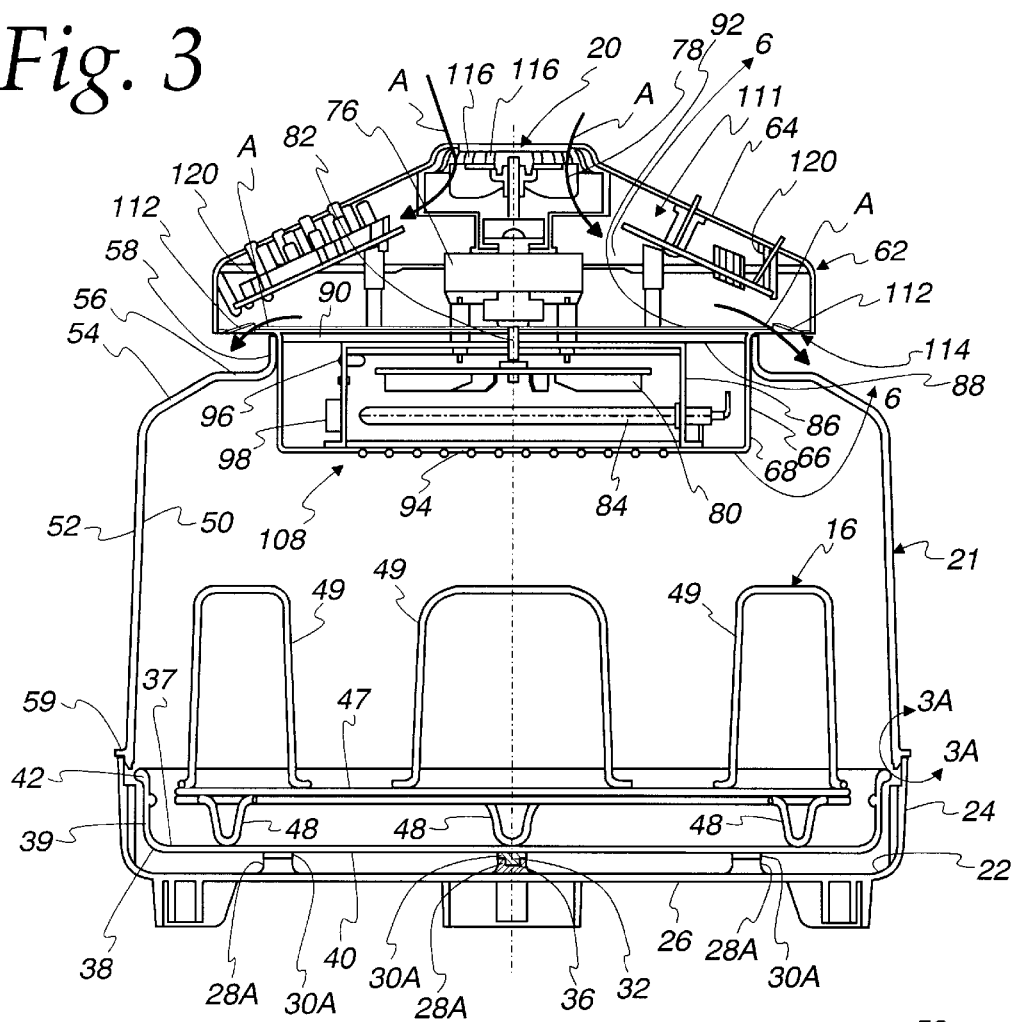
FIG. 3 is a somewhat diagrammatic section view of the oven shown in FIG. 1.

As best seen in FIGS. 2 and 3, the base 12 has an interior surface 22 defined by a generally cylindrical side wall 24 and a planar bottom 26. A pair of handles 27 extend from the cylindrical side wall 24 to allow a user to move the oven from one location to another. The interior surface 22 surrounds the oven pan 14 and is spaced from the oven pan 14 by an air gap. The base 12 further includes one or more supports 28 for the oven pan 14 and one or more thermal insulators 30 between the one or more supports 28 and the oven pan 14 to prevent overheating of the base 12 by the heat from the oven pan 14. In the preferred embodiment shown in FIGS. 2 and 3, the one or more supports 28 are provided in the form of three cylindrical pillars 28A, and the one or more thermal insulating spacers 30 are provided in the form of three cylindrical spacers 30A, each supported by one of the pillars 28A. As seen in the section view of the spacer 30A and pillar 28A in FIG. 3, each of the spacers 30A includes a cylindrical stub 32 that is engaged in a mating hole 36 in each pillar 28A to retain each of the spacers 30A to the respective pillar 28A. While it is preferred that the cross-sections of the spacers 30A and the pillars 28A be generally circular, it should be understood that the invention contemplates non-circular cross-sections, such as, for example, triangular, oval, square, rectangular, trapezoidal, hexagonal, etc. The oven pan 14 is supported on the insulators 30 to maintain the air gap between the interior surface 22 and the cooking pan 14 and to prevent overheating of the base 12, including the handles 27. Preferably, the plastic base 12 is made from a suitable polycarbonate material and the thermal insulators 30 are made from a suitable silicone rubber insulating material.

Figure 4:
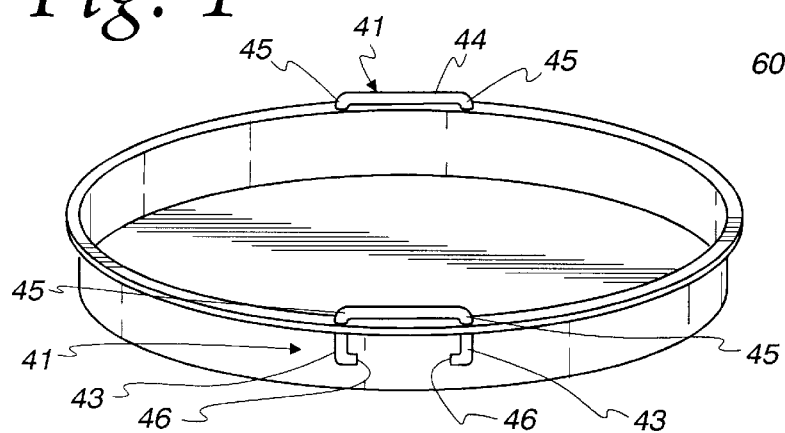
FIG. 4 is a perspective view of an oven pan of the oven shown in FIG. 1.

The metallic oven pan 14 includes an interior surface and an exterior surface 38 defined by a cylindrical side wall 39 and a planar bottom 40. Preferably the oven pan 14 is a one piece construction made of aluminum plate with a suitable nonstick PTFE coating on the interior surface 37. A pair of retractable handles 41 are mounted to a lip 42 that defines an outer periphery of the oven pan 14. The handles 41 are mounted to the lip 42 for movement between a first position, shown in FIG. 2, where the handles 41 are extended from the lip 42 so that a user may grasp the handles 41 to remove the pan 14 from the base 12, and a second position, shown in FIG. 4, where the handles 41 are retracted toward lip 2 to allow the oven housing 18 to be positioned above the oven pan 14, as shown in FIG. 3, without interfering with the handles 41. As best seen in FIG. 4, each of the handles 41 has a pair of legs 43 extending from a grasping member 44. Each of the legs 43 are received in a vertical guide hole 45 formed in the lip 42 to guide the handles 41 between the first and second positions. Each of the legs terminate in a tab 46 that engages the lip 42 with the handle 41 in the first position. Preferably, the handles are made from a unitary piece of metallic wire that is bent to form the grasping member, the legs 43, and the tabs 46.

The cooking rack 16 includes a planar grid 47 for supporting food items that are being cooked, a first set of loop projections 48 extending in one direction from the plane of the grid 47 and a second set of loop projections 49 extending in the opposite direction from the plane of the grid 47. The projections 48 can be used to support the grid to provide a first cooking height for food items supported by the grid 47, while the projections 49 can be used to support the grid 47 to provide a second cooking height for the grid 47. Preferably, the cooking rack 16 is made from 304 stainless steel with a suitable non-stick PTFE coating.

Figure 3A:
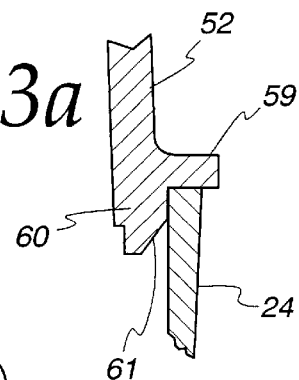
FIG. 3A is an enlarged view of the area indicated by lines 3A—3A in FIG. 3.

As best seen in FIG. 3, the oven housing 18 includes an interior surface 50 defined by a generally cylindrical side wall 52 that blends into a generally conicalshaped side wall 54 which in turn blends into a planar upper wall 56 which finally blends into a generally cylindrical ring 58. An annular lip 59 is formed on the outer surface of the wall 52 and serves to support the oven housing 18 on the side wall 24 of the base 12. A portion 60 of the wall 52 that extends below the lip 59 cooperates with the side wall 24 of the base 12 to restrict the leakage of hot gases, such as steam, from the cooking enclosure 21. As best seen in FIG. 3A, the portion 60 includes an annular lead-in chamfer or relief 61 that serves to guide the portion 60 into the base 12, thereby easing the engagement of the oven housing 18 to the base 12 and preventing the mislocation of the housing 18 relative to the base 12. The relief 61 allows for the portion 60 to be inserted into the base 12 without precise vertical movement of the housing 18 relative to the base 12, i.e., the housing 18 can be inserted into the base 12 while being tilted somewhat relative to vertical. Preferably, the oven housing 18 is formed from a suitable transparent polycarbonate material.

Figure 5:
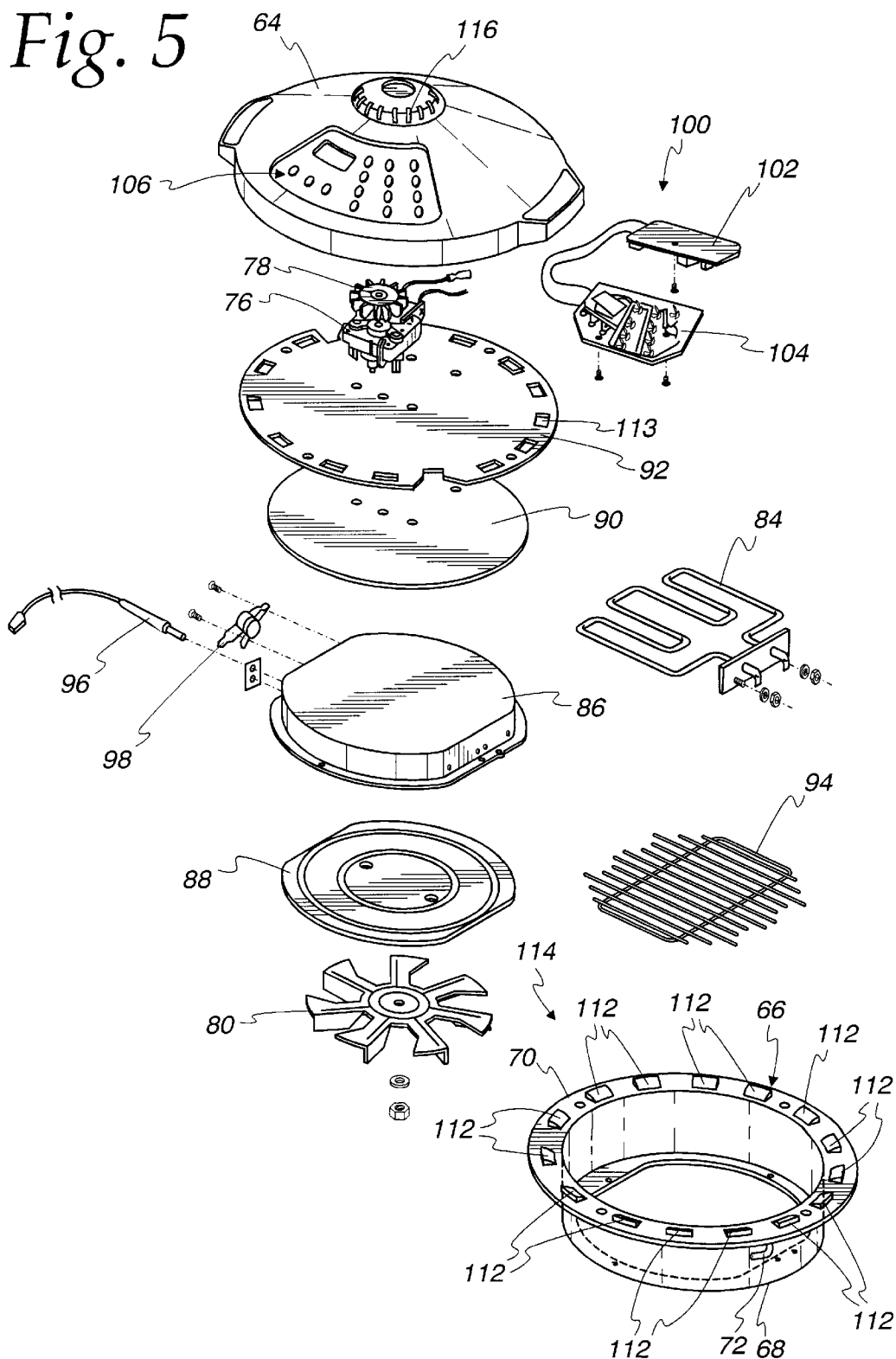
FIG. 5 is an exploded view of a power head of the oven shown in FIG. 1.

As best seen in FIGS. 3 and 5, the power head 20 includes an exterior housing assembly 62. The assembly 62 includes a domed shape upper housing 64 having a pair of handles 64, and a lower housing 66 including a cylindrical wall portion 66 and an annular flange 70. As seen in FIG. 2, four equally spaced lands 72 (only one shown) are raised from the cylindrical wall 66 to engage a plurality of ramped tabs 74 formed on the ring 58 of the housing 18 to detachably connect the power head 20 and the housing 18. The power head 20 further includes a motor 76 for driving a cooling fan 78 and an oven fan 80 via a common shaft 82, an infrared electric heating element 84, a heater/fan housing 86, a radiation plate 88 mounted to an interior surface of the heater housing 86, a glass fiber thermal insulator 90 mounted between the heater housing 86 and the motor 76, a mica sheet 92 mounted between the upper housing 64 and the lower housing 66, a protective grid 94, a thermistor 96, a thermostat 98, and a controller 100 including a pair of control boards 102 and 164 for controlling the heating element 84 and the motor 76 in response to signals from the thermistor 96 and command signals input into a control panel 106 by a user. Preferably, the fan 78 is made of a suitable plastic material, while the fan 80 and the radiation plate 88 are made of aluminum plate in order to reflect the infrared energy from the heater 84 down toward the interior of the cooking enclosure 19. It is also preferred that the motor 76 drive the fans 78 and 80 at a speed in the range of 2500 rpm, which should provide an adequate air flow from the fan 80 to create a relatively even temperature throughout the cooking enclosure 21 and to speed the cooking of food by convection to supplement the infrared cooking, without generating the high speed air motion associated with some cyclonic electric counter-top ovens. Another benefit of the relatively low speed air flow created by the fan 80 is that it helps to maintain the hot surfaces of the oven 10 in a temperature range that will tend to emit infrared radiation and limits the decrease in emissivity of the non-metal materials of the oven 10. It is preferred that the heating element 84 be made of an incoloy 840 material coated with a G-1500 (CRC 1500) ceramic coating having a coating thickness of 20±5 μm, with the main components of the coating material being $SiO_2$, $TiO_2$, and $Al_2O_3$, with an inorganic pigment, mainly Si—O. The ceramic coating increases the emissive power of the heating element and shifts the emission spectrum to the infrared range. With this coating, the heating element 84 is capable of generating approximately 98% or more of its heat radiation in the infrared range. A sol-gel coating method is used for coating the ceramic material firmly onto the incoloy 840 material. Infrared electric heating elements of this construction have been used in the past on hair dryers, bread makers, etc. The grid 94 is preferably made of 304 stainless steel or from any suitable PTFE coated metallic material. Preferably, the upper housing is made from a suitable polycarbonate material and the lower housing and the heater housing are made from zinc plated steel or steel coated with a suitable non-stick PTFE coating.

Together, the cylindrical wall portion 68 of the lower housing 66, the heater housing 86, the radiation plate 88, the fan 80, and the heating element 84 define a heating unit 108 that extends into the cooking enclosure 21 through an opening 110 defined by the cylindrical portion 58 of the housing 18. Together, the upper housing 64 and the mica sheet 92 define a fan chamber 111 that is thermally insulated from the interior of the cooking enclosure 21 by the mica sheet 92, the glass fiber insulator 90, the heater housing 86, the radiation plate 88, and the lower housing 66. As best seen in FIGS. 3 and 5, a plurality of cooling air outlets 112 are formed in the annular flange 70 of the lower housing 66. Cut-outs 113 are provided in the mica sheet 92 to prevent interference between the outlets 112 and the mica sheet 92 and to allow a cooling air flow to pass through the mica sheet 92 to the outlets 112. Preferably, the outlets 112 are equally circumferentially spaced around the flange 70.

Together the flange 70 and the outlets 112 define a cooling manifold 114 that surrounds the opening 110 of the housing 18 and faces the surface 56 outside of the cooking enclosure 21. The cooling fan 78 actively cools the fan chamber 111 and the walls 52, 54, 56 and 58 of the housing 18 by drawing a cooling air flow through a plurality of inlet openings 116 formed in the upper housing 64 and forcing the cooling air to exit through the outlets 112, which direct the cooling air flow toward the surface 56 of the housing 18 to cool the housing 18, as indicated by arrows A.

Figure 6:
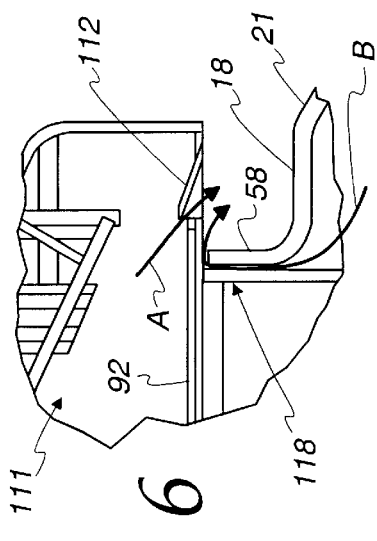
FIG. 6 is an enlarged view of the area indicated by lines 6—6 in FIG. 3.

As best seen in FIG. 6, the wall 68 and the flange 70 are spaced from the cylindrical ring 58 of the housing 18 by the tabs 74 to define a hot gas vent 118 that surrounds the heating unit 108 between the heating unit 108 and the outlets 112 to vent hot gas, such as steam, from the inside of the cooking enclosure 21 for mixture with the cooling air flow from the air outlets 112, as shown by the arrow B.

The control boards 102 and 104 are spaced from the interior surface of the upper housing 64 by a plurality of mount supports 120 to allow the cooling air flow to pass over both sides of the control boards 102 and 104 as it circulates around the fan chamber 111 before exiting through the outlets 112, thereby enhancing the cooling of the electronics on the control boards 102 and 104.

Figure 7:
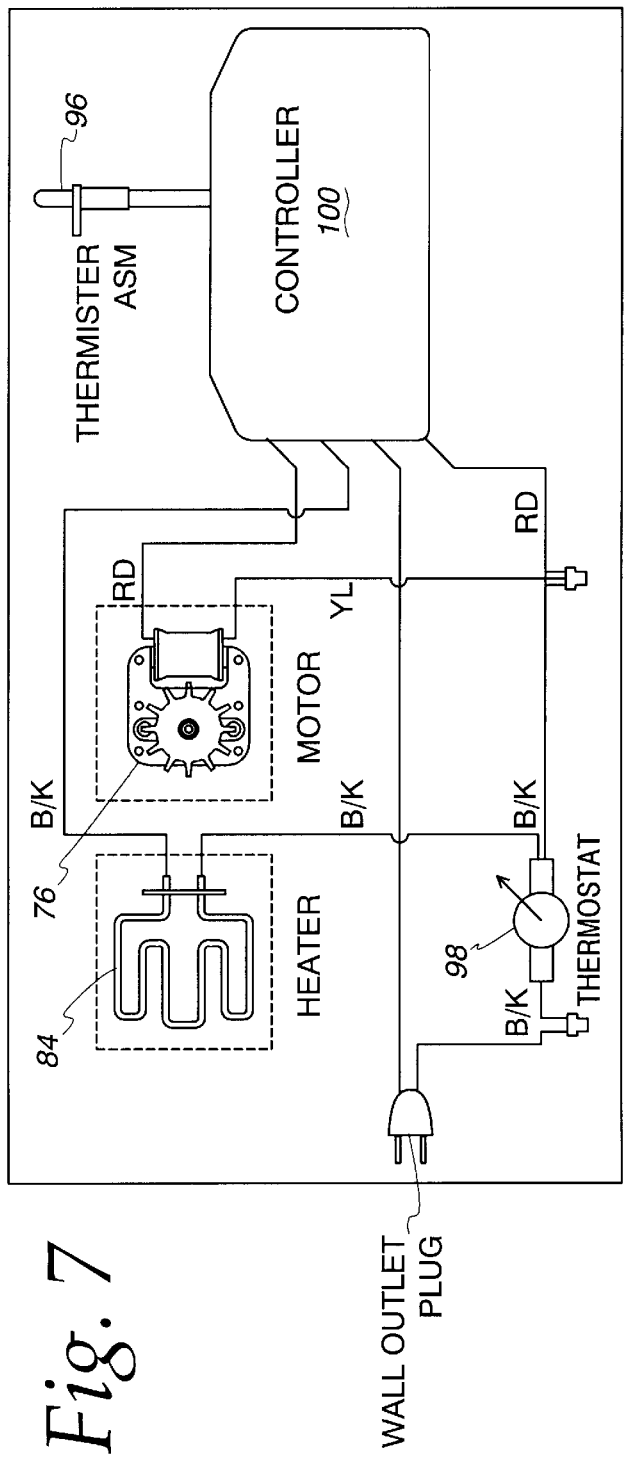
FIG. 7 is a diagrammatic representation of the operating components of the oven shown in FIG. 1.

As best seen in FIG. 7, the controller 100 is connected to the motor 76 and the heating element 84 to control the flow of electric power to the motor 76 and the heating element 84 in response to signals from the thermistor 96 and command signals input by the control panel 106 by a user. The controller is configured to selectively power the heating element at a number of power levels P from a minimum power to a maximum power. At each power increment P, the controller 100 powers the heating element when the thermistor 96 indicates that the temperature in the cooking enclosure 21 has fallen below a low temperature set point associated with the particular power level P. The controller 100 then terminates power to the heating element 84 when the temperature indicated by the thermistor 96 exceeds a high temperature set point associated with the particular power level P. The controller provides power continuously to the motor 76 during the heating operations regardless of the power level selected.

Figure 8:
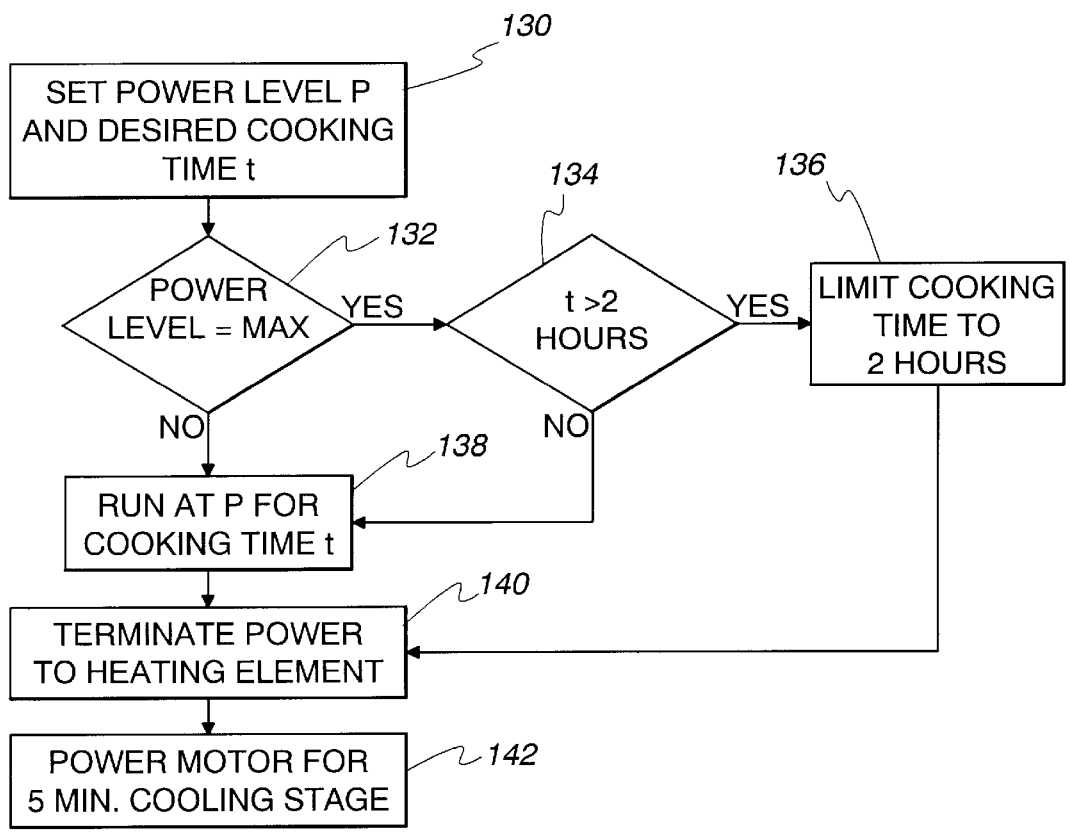
FIG. 8 is a flow chart illustrating selected operational features of the oven shown in FIG. 1.

As best seen in FIG. 8, the controller is configured to limit the cooking time at the maximum power setting to two hours to prevent overheating of the oven 10. More specifically, after a user sets the power level P and enters the desired cook time t at block 130, it is determined at 132 whether the power has been set to the maximum power level. If the power is set to maximum, it is determined at 134 whether the desired cooking time exceeds two hours. If the desired cooking time exceeds two hours, the cooking time is automatically limited to two hours by the controller 100 at 136. If the desired cooking time is less than two hours, or if the power level P is not set to maximum, the controller is configured to run the heating element 84 and the motor 76 at the power level P and for the desired cooking time t, as shown at block 138.

After the cooking time has expired, the controller 100 is configured to terminate power to the heating element 84 and to the motor 76. However, as an optional feature, after the cooking time has expired, the controller 100 can be configured to terminate power to the heating element 84 while providing power to the motor 76 for a five minute cooling stage, as shown at 140 and 142. This may allow time for the hot gases in the cooking enclosure 21 to vent and to be cooled by the cooling air flow from the outlets 112, thereby preventing hot gases, such as steam from accumulating in the cooking enclosure 21 and/or the fan chamber 111 and also preventing the handles 65 from overheating.

Figure 9A:
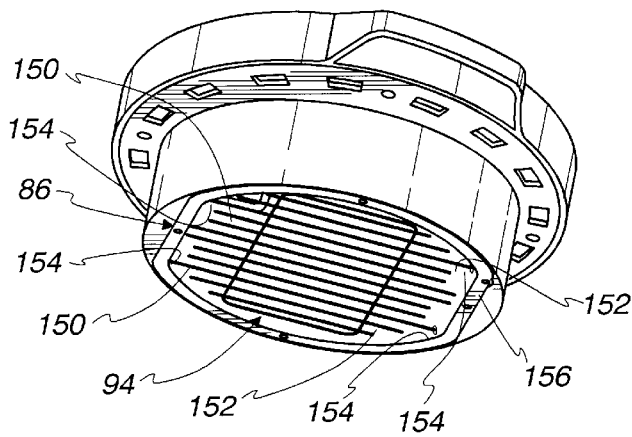
FIGS. 9A–D are perspective views illustrating the mounting and the removal of a protective grid of the oven shown in FIG. 1.
Figure 9B:
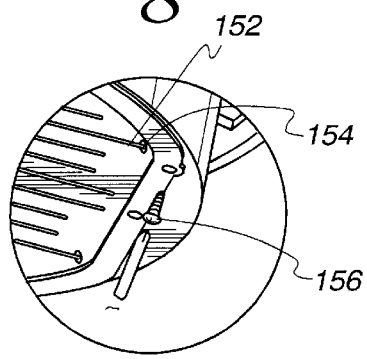
Figure 9C:
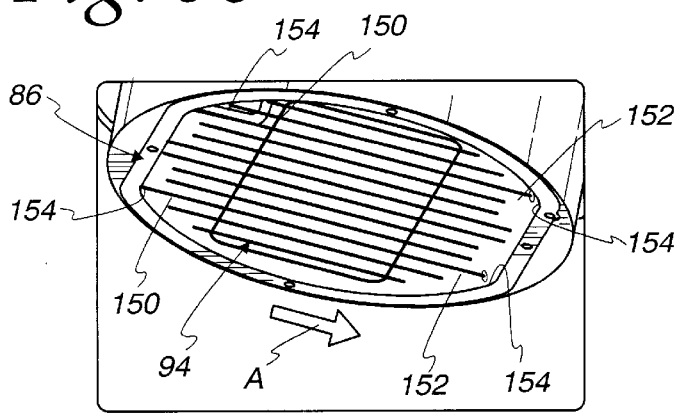
Figure 9D:
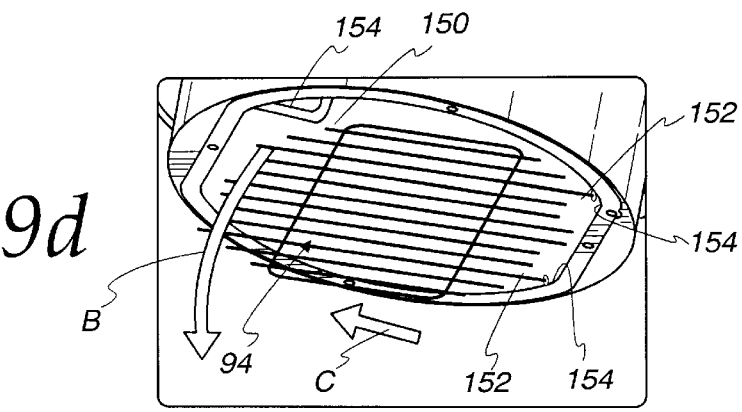

As best seen in FIG. 9A, the protective grid 94 includes a first pair of legs 150 that are oppositely directed relative to a second pair of legs 152. As best seen in FIG. 9B, each of the legs 150, 152, is slidably received in a mating aperture 154 in the heater housing 86 to detachably mount the protective grid 94 to the heater housing 86. A fastener 156 is engaged with the heater housing 86 for movement between a first position shown in FIG. 9A where the fastener engages one of the legs 152 to restrict movement of the grid 94 relative to the heater housing 86 to prevent removal of the grid 94 from the heater housing 86, and a second position shown in FIG. 9B where the fastener is disengaged from the one leg 152 to allow removal of the grid 94 from the heater housing 86. Preferably, as seen in FIG. 9B, the fastener 156 is provided in the form of a threaded set screw that is threadably engaged with the housing 86, with the end of the set screw frictionally engaging the one leg 152 in the first position shown in FIG. 9A. In this regard, it should be noted that for the fastener to be in the second position it need not be completely removed from the housing 86 as shown in FIG. 9B, rather, the fastener 156 need only be positioned so that it is disengaged from the one leg 152 to allow movement of the grid 94 relative to the housing 86. As best seen in FIG. 9C, with the fastener 156 in the second position, the legs 152 can be slid in the apertures 154 to allow the grid 94 to move relative to the housing 86 in the direction of the legs 152, as indicated by Arrow A, to thereby remove the legs 150 from their mating apertures 154. Once the legs 150 are removed from their mating apertures 154, the grid 94 can be tilted downward as shown by the arrow B in FIG. 9D and then the grid 94 can be moved in the direction of the legs 150, as indicated by Arrow C, to thereby remove the legs 152 from their mating apertures 154 and thus, the grid 94 from the housing 86. Removal of the grid allows for cleaning of the heating element 84, the fan 80, the reflector plate 88, and the interior of the housing 86.

Figure 10:
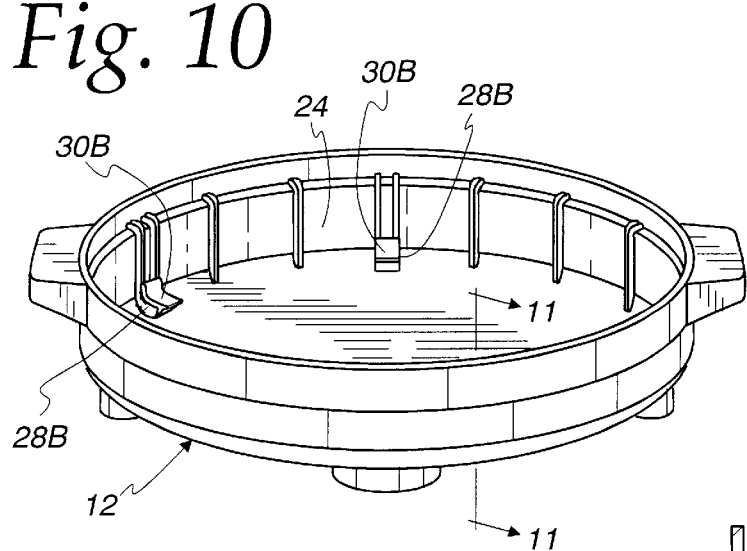
FIG. 10 is a perspective view of an optional embodiment of a base for the oven shown in FIG. 1.
Figure 11:
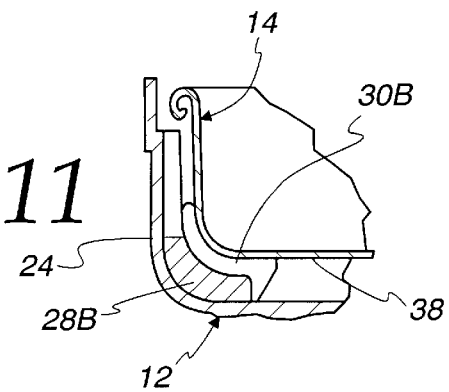
FIG. 11 is an enlarged, fragmentary section view taken substantially along line 11—11 in FIG. 10.

As best seen in FIGS. 10 and 11, in an optional embodiment of the base 12, the one or more supports 28 are provided in the form of three or more circumferentially spaced feet 28B that extend from the side wall 24 to underlie the oven pan 14, and the thermal insulators 30 are provided in the form of three or more thermal insulating spacers 30B, each supported by one of the feet 28B.

Figure 12:
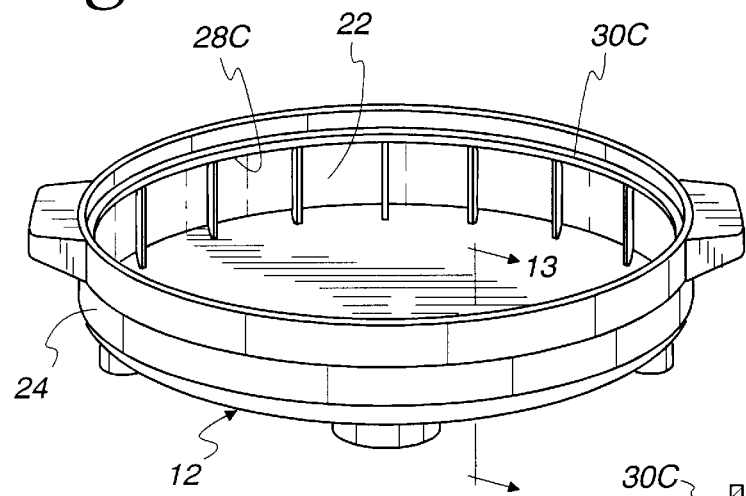
FIG. 12 is a perspective view of another optional embodiment of a base 10 for the oven shown in FIG. 1.
Figure 13:
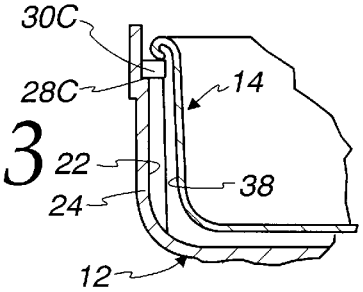
FIG. 13 is an enlarged, fragmentary section view taken substantially along line 13—13 in FIG. 12.

As best seen in FIGS. 12 and 13, in one optional embodiment of the base 12, the one or more supports 28 is provided in the form of an annular shoulder 28C formed on the interior surface 22 of the base 12, and the one or more insulators 30 are provided in the form of a thermal insulating ring 30C that is supported by the shoulder 28C.

What is claimed is:

1. An electric oven for cooking food, the oven comprising:
    a cooking enclosure including an upper surface with an opening therein; and
    a power head detachably connected to the cooking enclosure and including
        a heating unit extending into the cooking enclosure through said opening,
        a fan chamber positioned above the cooking enclosure and the heating unit,
        a fan mounted in the fan chamber to create a cooling air flow through the fan chamber,
        a plurality of air inlets to the fan chamber to allow said cooling air flow into the fan chamber, and
    a cooling manifold surrounding said opening and including a lower surface facing said upper surface outside of said cooking enclosure, the cooling manifold in fluid communication with the fan chamber and including a plurality of air outlets arranged in said lower surface to direct the cooling air flow from the fan chamber toward the upper surface of the cooking enclosure to cool the upper surface.

2. The electric oven of claim 1 wherein said heating unit includes an electric infrared heating element made of incoloy 840 coated with a coating material, the main components of the coating material being $SiO_2$, $TiO_2$, and $Al_2O_3$.

3. An electric oven for cooking food, the oven comprising:
    a cooking enclosure including an upper surface with an opening therein; and
    a power head detachably connected to the cooking enclosure and including
        a heating unit extending into the cooking enclosure through said opening,
        a fan chamber positioned above the cooking enclosure and the heating unit,
        a fan mounted in the fan chamber to create a cooling air flow through the fan chamber,
        a plurality of air inlets to the fan chamber to allow said cooling air flow into the fan chamber, and
        a cooling manifold surrounding said opening and facing said upper surface outside of said cooking enclosure, the cooling manifold in fluid communication with the fan chamber and including a plurality of air outlets arranged to direct the cooling air flow from the fan chamber toward the upper surface of the cooking enclosure to cool the upper surface.

wherein said heating unit is spaced from said opening to define a hot gas vent surrounding said heating unit and located between said heating unit and said air outlets to vent hot gas from the inside of the cooking enclosure for mixture with said cooling air flow from said air outlets.

4. The electric oven of claim 3 wherein said electric oven further includes a controller configured to run the fan for a predetermined cooling period after power to the heating unit has been terminated.

5. An electric oven for cooking food, the oven comprising:
a cooking enclosure including an oven housing and a metallic oven pan having interior and exterior surfaces and located beneath the oven housing;
a power head detachably connected to the cooking enclosure and including a heating unit extending into the cooking enclosure, the heating unit including an electric heating element arranged to direct heat toward the interior surface of the oven pan; and
a plastic base having an interior that surrounds the oven pan with an air gap, the base including one or more supports for the oven pan and one or more thermal insulators between the posts and the exterior surface of the oven pan to prevent overheating of the base by the heat directed at the interior surface of the oven pan.

6. The electric oven of claim 5 wherein the one or more supports comprises a plurality of support posts, and the one or more thermal insulators comprises a plurality of thermal insulators, each insulator between one of the support posts and the exterior surface of the pan.

7. The electric oven of claim 5 wherein the interior of the base is defined by an upwardly extending side wall, the one or more supports comprises a plurality of feet that extend from the side wall to underlie the oven pan, and the one or more thermal insulators comprises a plurality of thermal insulators, with each insulator positioned between one of the feet and the exterior surface of the oven pan.

8. The electric oven of claim 5 wherein the one or more supports comprises an annular shoulder on the interior of the base, and the one or more thermal insulators comprises an annular insulating ring between the shoulder and the exterior surface of the oven pan.

9. The electric oven of claim 5 wherein the base comprises a polycarbonate material.

10. The electric oven of claim 5 wherein the insulators comprise a silicon material.

11. The electric oven of claim 5 wherein the one or more supports are a unitary part of the base.

12. An electric oven for cooking food, the oven comprising:
a base;
a cooking enclosure supported by the base, the cooking enclosure defined by an oven housing and an oven pan located beneath the oven housing and surrounded by an interior of said base, the oven pan including a lip defining an outer periphery of the oven pan, and a pair of retractable handles mounted to the lip for movement between a first position where the handles are extended from the lip so that a user may grasp the handles to remove the pan from the base and a second position where the handles are retracted toward the lip to allow the oven housing to be positioned above the oven pan without interfering with the handles; and
a power head detachably connected to the cooking enclosure and including a heating unit extending into the cooking enclosure.

13. The electric oven of claim 12 wherein each of the handles has a pair of legs extending from a grasping member, each of the legs received in a guide hole formed in the lip to guide the handles between the first and second positions, each of the legs terminating in a tab that engages the lip with the handle in the first position.

14. The electric oven of claim 13 wherein each of the handles comprises a unitary piece of wire that is bent to form the grasping member, the legs, and the tabs.

15. A counter-top electric oven for cooking food, the oven comprising:
a cooking enclosure including an oven housing and a metallic oven pan having interior and exterior surfaces and located beneath the oven housing, the oven housing including an upper surface with an opening therein, the oven pan including a lip defining an outer periphery of the oven pan, and a pair of retractable handles mounted to the lip for movement between a first position where the handles are extended from the lip so that a user may grasp the handles to remove the pan from the base and a second position where the handles are retracted toward the lip to allow the oven housing to be positioned above the oven pan without interfering with the handles, each of the handles having a pair of legs extending from a grasping surface, each of the legs being received in a guide hole formed in the lip to guide the handles between the first and second positions, each of the legs terminating in a tab that engages the lip with the handle in the first position;
a power head detachably connected to the cooking enclosure and including a heating unit extending into the cooking enclosure through said opening, the heating unit including an electric heating element arranged to direct heat toward the interior surface of the oven pan, the heating unit spaced from said opening to define a hot gas vent surrounding said heating unit to vent hot gas from the inside of the cooking enclosure, the power head further including
a fan chamber positioned above the cooking enclosure and the heating unit,
a fan mounted in the fan chamber to create a cooling air flow through the fan chamber,
a plurality of air inlets to the fan chamber to allow said cooling air flow into the fan chamber, and
a cooling manifold surrounding said opening and said hot gas vent and facing said upper surface outside of said cooking enclosure, the cooling manifold in fluid communication with the fan chamber and including a plurality of air outlets arranged to direct the cooling air flow from the fan chamber toward the upper surface of the cooking enclosure to cool the upper surface and to mix with said hot gas from said hot gas vent; and
a plastic base having an interior that surrounds the oven pan with an air gap, the base including a plurality of support posts to support the oven pan and a plurality of thermal insulators between the posts and the exterior surface of the oven pan to prevent overheating of the base by the heat directed at the interior surface of the oven pan.

* * * * *

(12) EX PARTE REEXAMINATION CERTIFICATE (8476th)
United States Patent
Moon et al.

(10) Number: US 6,201,217 C1
(45) Certificate Issued: Aug. 23, 2011

(54) COUNTER-TOP ELECTRIC COOKER

(75) Inventors: Jung S. Moon, Buffalo Grove, IL (US); Rong Liu, Wheeling, IL (US); Alan R. Kelley, Barrington, IL (US)

(73) Assignee: Hearthware Home Products, Inc., Wheeling, IL (US)

Reexamination Request:
No. 90/009,775, Jul. 22, 2010

Reexamination Certificate for:
Patent No.: 6,201,217
Issued: Mar. 13, 2001
Appl. No.: 09/290,150
Filed: Apr. 12, 1999

(51) Int. Cl.
*A47J 37/00* (2006.01)
*A47J 36/16* (2006.01)
*A21B 1/26* (2006.01)
*A21B 1/50* (2006.01)

(52) U.S. Cl. ............... 219/386; 126/21 A; 126/333; 219/392; 219/400; 220/769; 220/770; 99/476

(58) Field of Classification Search .............. None
See application file for complete search history.

(56) References Cited

U.S. PATENT DOCUMENTS

| | | |
|---|---|---|
| 2,274,325 A | 2/1942 | Ford |
| D133,344 S | 8/1942 | Austin |
| 2,654,824 A | 10/1953 | Schroeder |
| 2,848,592 A | 8/1958 | Mergen |
| 2,864,932 A | 12/1958 | Forrer |
| 2,893,307 A | 7/1959 | Rodriguez |
| 3,281,575 A | 10/1966 | Ferguson, Jr. |
| D212,820 S | 11/1968 | Benes |
| 3,851,639 A | 12/1974 | Beddoe |
| 3,882,767 A | 5/1975 | Oyler et al. |
| 4,188,520 A | 2/1980 | Dills |
| 4,210,072 A | 7/1980 | Pedrini |
| 4,350,874 A | 9/1982 | Nishikawa |
| 4,476,848 A | 10/1984 | Protas |
| 4,625,097 A | 11/1986 | Miwa |
| 4,629,850 A | 12/1986 | Tanabe |
| 4,629,865 A | 12/1986 | Freedman |
| 4,663,517 A | 5/1987 | Huff et al. |
| D293,539 S | 1/1988 | Nishikawa |
| 4,756,091 A | 7/1988 | Van Denend |
| 4,817,509 A | 4/1989 | Erickson |
| D302,095 S | 7/1989 | Nishikawa |
| D302,642 S | 8/1989 | Nishikawa |
| 4,870,255 A | 9/1989 | Fujii |
| 4,913,047 A | 4/1990 | Burley |
| D313,679 S | 1/1991 | Sakamoto |
| 5,045,671 A | 9/1991 | Kanaya et al. |
| 5,097,112 A | 3/1992 | Kanaya et al. |
| 5,107,097 A | 4/1992 | Negandhi et al. |
| D328,834 S | 8/1992 | Chang |
| 5,157,239 A | 10/1992 | Kanaya et al. |
| 5,165,328 A | 11/1992 | Erickson |
| 5,217,545 A | 6/1993 | Smith et al. |
| D344,873 S | 3/1994 | Chang |
| 5,329,919 A | 7/1994 | Chang |

(Continued)

FOREIGN PATENT DOCUMENTS

| | | |
|---|---|---|
| KR | 1996-0002662 | 3/1996 |
| WO | WO-2009-070338 | 4/2009 |

OTHER PUBLICATIONS

ISR& WO in PCT/US08/13235.
Hearthware's LPR 2.2 Initial Infringement Contentions—Oct. 28, 2009.
Morningware's LPR 2.3 Initial Invalidity, Noninfr. And Unenf. Contentions—Nov. 9, 2009.

(Continued)

*Primary Examiner*—David O. Reip

(57) ABSTRACT

A counter-top electric oven is provided that includes a number of features that prevent overheating of the components of the oven. These features include an actively cooled fan chamber, a hot gas vent, a cooling manifold that directs cooling air to cool the cooking enclosure and hot gas vented from the hot gas vent, and a base with thermally insulated supports for a metallic oven pan of the cooking enclosure.

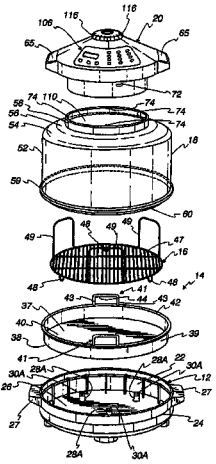

U.S. PATENT DOCUMENTS

| Patent | Date | Name |
|---|---|---|
| 5,338,616 A | 8/1994 | Ishii |
| D350,449 S | 9/1994 | Kaneko |
| D355,564 S | 2/1995 | Dornbush et al. |
| 5,403,607 A | 4/1995 | Erickson |
| 5,404,420 A | 4/1995 | Song |
| 5,416,950 A | 5/1995 | Dornbush |
| D358,963 S | 6/1995 | Kaneko |
| 5,423,249 A | 6/1995 | Meyer |
| 5,437,108 A | 8/1995 | Alseth |
| 5,438,916 A | 8/1995 | Dornbush |
| D364,308 S | 11/1995 | Chang |
| 5,465,651 A | 11/1995 | Erickson |
| 5,466,912 A | 11/1995 | Dornbush |
| 5,484,621 A | 1/1996 | Erickson |
| 5,485,780 A | 1/1996 | Koether et al. |
| D367,396 S | 2/1996 | Hsu |
| D369,274 S | 4/1996 | Dornbush et al. |
| D369,514 S | 5/1996 | Baldwin |
| 5,513,558 A | 5/1996 | Erickson |
| 5,520,096 A | 5/1996 | Dornbush |
| 5,534,681 A | 7/1996 | Hwang |
| 5,548,102 A | 8/1996 | Kwon |
| 5,598,769 A | 2/1997 | Luebke et al. |
| 5,676,044 A | 10/1997 | Lara |
| 5,699,722 A | 12/1997 | Erickson |
| 5,735,190 A | 4/1998 | Sham |
| 5,747,781 A | 5/1998 | Kim et al. |
| 5,793,023 A | 8/1998 | Hong et al. |
| 5,801,357 A | 9/1998 | Danen |
| 5,801,362 A | 9/1998 | Pearlman et al. |
| 5,845,563 A | 12/1998 | Haring |
| 5,877,477 A | 3/1999 | Petty |
| 5,878,508 A | 3/1999 | Knoll et al. |
| 5,880,436 A | 3/1999 | Keogh |
| 5,974,957 A | 11/1999 | Ysen |
| 6,018,146 A | 1/2000 | Uzgiris et al. |
| D424,862 S | 5/2000 | Holbrook |
| 6,069,345 A | 5/2000 | Westerberg |
| 6,085,442 A | 7/2000 | Erickson |
| 6,093,918 A | 7/2000 | Sohn |
| 6,093,919 A | 7/2000 | Seo et al. |
| 6,127,666 A | 10/2000 | Sohn |
| 6,172,347 B1 | 1/2001 | Lee |
| 6,198,076 B1 | 3/2001 | Moen |
| 6,201,217 B1 | 3/2001 | Moon |
| 6,255,630 B1 | 7/2001 | Barnes et al. |
| 6,316,757 B1 | 11/2001 | Kim et al. |
| 6,363,836 B1 | 4/2002 | Usherovich |
| 6,448,540 B1 | 9/2002 | Braunisch et al. |
| 6,502,265 B2 | 1/2003 | Blair |
| D469,657 S | 2/2003 | Becker |
| 6,521,870 B2 | 2/2003 | Nolan et al. |
| 6,617,554 B2 | 9/2003 | Moon |
| D487,670 S | 3/2004 | Moon |
| 6,727,478 B2 | 4/2004 | Rael |
| 6,730,880 B2 | 5/2004 | Smith |
| D490,648 S | 6/2004 | Moon |
| 6,747,250 B1 | 6/2004 | Cha |
| 6,809,301 B1 | 10/2004 | McIntyre et al. |
| 6,917,016 B2 | 7/2005 | Baecker et al. |
| 6,917,017 B2 | 7/2005 | Moon |
| 6,936,795 B1 | 8/2005 | Moon |
| 6,940,049 B2 | 9/2005 | Harwell et al. |
| 6,967,314 B2 | 11/2005 | Sauter et al. |
| 7,012,220 B2 | 3/2006 | Boyer et al. |
| 7,021,203 B2 | 4/2006 | Backus |
| 7,159,510 B2 | 1/2007 | LaMaster et al. |
| 7,225,729 B2 | 6/2007 | Backus |
| 7,323,663 B2 | 1/2008 | Cavada et al. |
| 7,348,521 B2 | 3/2008 | Lee et al. |
| 7,360,533 B2 | 4/2008 | McFadden |
| 7,479,006 B2 | 1/2009 | Newsom |
| 7,487,716 B2 | 2/2009 | Swank et al. |
| 7,619,186 B2 | 11/2009 | Cavada et al. |
| 2002/0023545 A1 | 2/2002 | Backus |
| 2002/0144607 A1 | 10/2002 | Backus |
| 2003/0062360 A1 | 4/2003 | Moon |
| 2005/0172835 A1 | 8/2005 | Lamaster et al. |
| 2006/0144250 A1 | 7/2006 | Backus |
| 2006/0225580 A1 | 10/2006 | Fernandez |
| 2009/0025248 A1 | 7/2007 | Lannon |
| 2008/0190911 A1 | 8/2008 | Adamski |

OTHER PUBLICATIONS

Hearthware's initial Reponse to Invalidity Contentions Pursuant to LPR 2.5—Jan. 22, 2010.
DI 107, 107a, 107b, and 107c—Hearthware's First Amended Counterclaims including exhibits A, B, and C—Feb. 11, 2010.
DI 125 and DI 125a—Morningware's Supplemental Answer to Hearthware's First Amended Counterclaims and Exhibit—Apr. 29, 2010.
Morningware's LPR 3.1 Final Invalidity And Unenf. Contentions—Jul. 6, 2010.
Hearthware's LPR 3.1 Amended and Final Infringement Contentions—Jul. 6, 2010.
Memorandum In Support of Morningware's Motion to Strike Hearthware Home Product's LPR 3.1 Final Infringement Contentions And Dismiss Hearthware's Infringement Claims—Jul. 21, 2010.
Morningware's LPR 3.2 Final Non–Infringement Contentions—Aug. 3, 2010.
Hearthware's Opposition To Morningware's Motion To Strike Hearthware's LPR 3.1 Final Infringement Contentions—Aug. 16, 2010.
Morningware's Reply to Hearthware's Opposition to Morningware's Motion To Strike Hearthware's LPR 3.1 Final Infringement Contentions—Aug. 30, 2010.
Hearthware's Response to Morningware's Invalidity Contentions Pursuant to LPR 3.2—Aug. 3, 2010.
Morningware's Opening Claim Construction Brief and Exhibits A, B, C & D—Under LRP 4.2—Sep. 22, 2010.
Hearthware's Claim Construction Brief Under LPR 4.2 and Appendix E—Oct. 20, 2010.
DI 144—Plaintiff's Counterdefendant Morningware, Inc.'s Reply Claim Construction Brief on U.S. Patent No. 6,201, 217 Pursuant to LPR 4.2(D)—Nov. 3, 2010.
DI 134–1—Joint Claim Construction Chart—Sep. 8, 2010.
Final Joint Claim Construction Chart—Nov. 10, 2010.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

New claims 16-44 are added and determined to be patentable.

Claims 2-15 were not reexamined.

1. An electric oven for cooking food, the oven comprising:
    a cooking enclosure including an upper surface with an opening therein; and
    a power head detachably connected to the cooking enclosure and including
    a heating unit extending into the cooking enclosure through said opening,
    a fan chamber positioned above the cooking enclosure and the heating unit,
    a fan mounted in the fan chamber to create a cooling air flow through the fan chamber,
    a plurality of air inlets to the fan chamber to allow said cooling air flow into the fan chamber, and
    a cooling manifold surrounding said opening and including a lower surface facing said upper surface outside of said cooking enclosure, the cooling manifold in fluid communication with the fan chamber and including a plurality of air outlets arranged in said lower surface to direct the cooling air flow from the fan chamber toward toward the upper surface of the cooking enclosure to cool the upper surface, *wherein said heating unit is spaced from said opening to define a hot gas vent surrounding said heating unit and located between said heating unit and said air outlets to vent hot gas from the inside of the oven housing for mixture with said cooling air flow from said air outlets.*

16. *The electric oven of claim 1, further comprising: a thermistor.*

17. *The electric oven of claim 1, further comprising: an oven pan having an interior surface, and an exterior surface and located adjacent to and at least partially beneath a lower portion of the cooking enclosure.*

18. *The electric oven of claim 17, wherein said heating unit comprises:*
    *a heating element arranged to direct heat toward the interior surface of oven pan.*

19. *The electric oven of claim 17, wherein the oven pan comprises at least one of:*
    *a circular portion,*
    *a cylindrical portion,*
    *at least one handle,*
    *a lip about an at least one outer periphery of the oven pan, or*
    *a one piece construction.*

20. *The electric oven of claim 17, wherein said oven pan comprises:*
    *a metallic oven pan.*

21. *The electric oven of claim 1, further comprising:*
    *a multiple height, stainless steel rack.*

22. *The electric oven of claim 1, further comprising:*
    *a plurality of feet on a bottom surface of the oven.*

23. *The electric oven of claim 1, wherein said plurality of air outlets direct at least a portion of said cooling air flow in a direction generally toward the upper surface of the cooking enclosure.*

24. *The electric oven of claim 1, wherein said plurality of air inlets are formed in an uppermost surface of said power head.*

25. *The electric oven of claim 1, wherein said plurality of air outlets of said power head are above an upper surface of the cooking enclosure.*

26. *The electric oven of claim 1, wherein outlines of said plurality of air outlets of said power head are formed exclusively in a surface of said cooling manifold of said power head.*

27. *The electric oven of claim 1, further comprising a controller coupled to said fan, and to said heating unit, wherein said controller is placed in a cavity of said power head above said heating unit.*

28. *The electric oven of claim 1, wherein said opening is circular and at least a portion of said plurality of air outlets of said cooling manifold of said power head are one of:*
    *formed substantially equidistant from one another about an entire periphery of a circular surface of said cooling manifold of said power head; or of substantially similar size in said cooling manifold of said power head.*

29. *An electric oven for cooking food, the oven comprising:*
    *a cooking enclosure comprising an oven housing comprising a generally conical upper surface, an upper ring with an opening therein, and a cylindrical portion; and*
    *a power head detachably connected to the cooking enclosure at the opening comprising:*
    *a heating unit extending into an upper portion of the oven housing of the cooking enclosure through said opening,*
    *a fan chamber positioned above the upper portion of said oven housing of the cooking enclosure and the heating unit,*
    *a fan comprising a plurality of blades and coupled to an electric motor, and mounted in the fan chamber to create a cooling air flow through the fan chamber,*
    *a plurality of air inlets to the fan chamber to allow said cooling air flow into the fan chamber, and*
    *a cooling manifold surrounding said opening and comprising a lower surface, said lower surface of said cooling manifold comprising an external surface, said lower surface comprising at least one of an annular ring or a cylindrical ring, said external surface of said lower surface of said cooling manifold facing in a -direction generally downward toward said generally conical upper surface of the oven housing of said cooking enclosure outside of said cooking enclosure, the cooling manifold in fluid communication with the fan chamber and including a plurality of air outlets arranged in said external sur-* face of said lower surface to direct the cooling air flow from the fan chamber generally downward toward the external generally conical upper surface of the oven housing of the cooking enclosure to cool the upper surface of the oven housing of the cooking enclosure outside of the power head.

30. The electric oven of claim 29, wherein said heating unit comprises an electrical heating element.

31. The electric oven of claim 29, wherein said heating unit is spaced from said opening to define a hot gas vent surrounding said heating unit and located between said heating unit and said air outlets to vent hot gas from the inside of the oven housing for mixture with said cooling air flow from said air outlets.

32. The electric oven of claim 29, further comprising:

a thermistor.

33. The electric oven of claim 29, further comprising:

an oven pan having an interior surface, and an exterior surface and located adjacent to and at least partially beneath a lower portion of the oven housing.

34. The electric oven of claim 33, wherein said heating unit comprises:

an electric heating element arranged to direct toward the interior surface of the oven pan.

35. The electric oven of claim 33, wherein the oven pan comprises at least one of:

a circular portion, a cylindrical portion, at least one handle, a lip about an outer periphery of the oven pan, or a one piece construction.

36. The electric oven of claim 33, wherein said oven pan comprises:

a metallic oven pan.

37. The electric oven of claim 29, further comprising:

a multiple height, stainless steel rack.

38. The electric oven of claim 29, further comprising:

a plurality of feet on a bottom surface of the oven.

39. The electric oven of claim 29, wherein said plurality of air outlets direct at least a portion of said cooling flow in a direction generally toward the upper surface of the oven housing in a radial direction outside of the power head.

40. The electric oven of claim 29, wherein said plurality of air inlets are formed in an uppermost surface of said power head.

41. The electric oven of claim 29, wherein said plurality of air outlets of said power head are above said upper surface of the cooking enclosure.

42. The electric oven of claim 29, wherein outlines of said plurality of air outlets of said power head are formed exclusively in a surface of said cooling manifold of said power head.

43. The electric oven of claim 29, further comprising a controller coupled to said fan, to said electric motor, and to said heating unit, wherein said controller is placed in a cavity of said power head above said heating unit.

44. The electric oven of claim 29, wherein said opening is circular and at least a portion of said plurality of air outlets of said cooling manifold of said power head are one of:

formed substantially equidistant from one another about an entire periphery of a circular surface of said cooling manifold of said power head; or formed of substantially similar size in said cooling manifold of said power head.

\* \* \* \* \*